United States Patent [19]

Braden et al.

[11] 4,398,616

[45] Aug. 16, 1983

[54] STEERING SYSTEM INCLUDING INDEPENDENTLY OPERATED REAR WHEEL STEERING MEANS FOR A VEHICLE

[75] Inventors: Donald G. Braden, Galion; David C. Riehl, Shelby, both of Ohio

[73] Assignee: Dresser Industries, Inc., Dallas, Tex.

[21] Appl. No.: 276,106

[22] Filed: Jun. 22, 1981

[51] Int. Cl.³ .............................................. B62D 5/08
[52] U.S. Cl. ..................................................... 180/140
[58] Field of Search .................................. 180/140, 23, 24

[56] References Cited

U.S. PATENT DOCUMENTS 3,903,983  9/1975  Yeske .................................. 180/140
4,175,638 11/1979  Christensen ......................... 180/140

OTHER PUBLICATIONS

Pettibone publication describing operation of Model 441-B Speed Swing

*Primary Examiner*—John A. Pekar
*Attorney, Agent, or Firm*—B. E. Deutsch

[57] ABSTRACT

A steering system for a construction vehicle operable to control the position of a pair of front wheels and a pair of rear wheels relative to the frame of the vehicle includes a hydraulic fluid circuit for distributing hydraulic fluid. A hydraulic cylinder is connected to each of the wheels for turning same in a desired manner. A steering wheel is interposed in the hydraulic fluid circuit for selectively directing hydraulic fluid to the cylinders for steering said wheels in a desired direction. A mode selector valve is interposed in the fluid flow circuit between the steering wheel and the cylinders for selectively selecting either four-wheel steer, crab steer, or front-wheel steer mode of steering for said vehicle. A control momentarily overrides the mode selector valve to isolate the rear hydraulic cylinders from the front hydraulic cylinders for permitting independent movement of the rear wheels of the vehicle.

2 Claims, 1 Drawing Figure

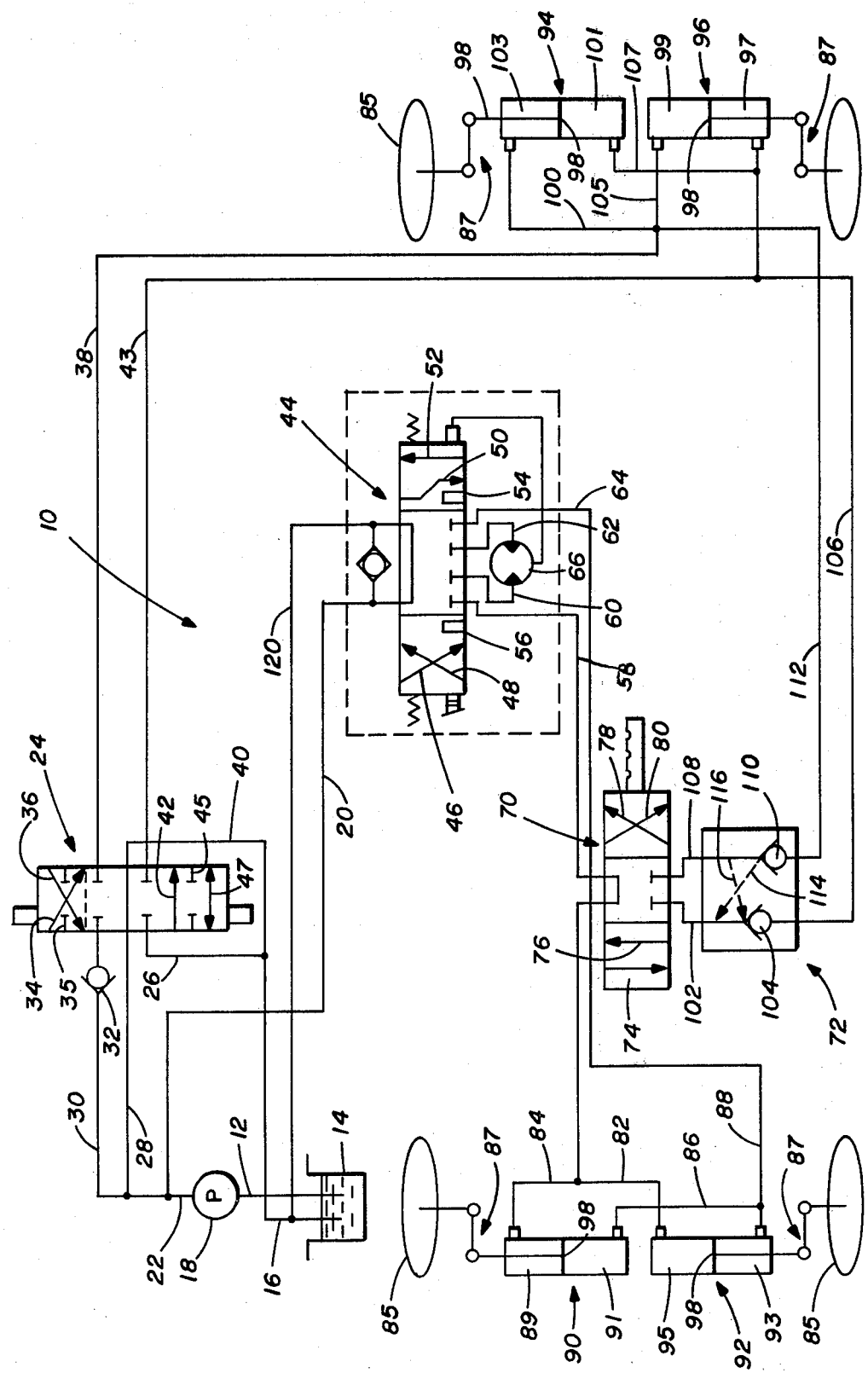

STEERING SYSTEM INCLUDING INDEPENDENTLY OPERATED REAR WHEEL STEERING MEANS FOR A VEHICLE

BACKGROUND OF THE INVENTION

This invention relates to a steering system for a multi-wheeled vehicle, and in particular to a system including means for momentarily isolating the rear wheels from the front wheels for permitting independent steering of the rear wheels relative to the front wheels.

Vehicles, such as movable construction equipment, are typically supported on wheels for movement along the underlying road or other surface. As is well known, the vehicles must be steerable in both forward and backward directions to permit safe and efficient operation.

Multi-purpose equipment is available for use in varied applications including railroad maintenance. When so employed, the wheels of the vehicle straddle the railroad's rails. Generally, such equipment has three independent steering modes of operation, i.e. four-wheel steer, front-wheel steer and crab steer, for steering the vehicle when moving in a forward direction.

In moving in the reverse or backward direction, it is necessary that the rear wheels be independently steerable to prevent the wheels from "climbing" the rails. Since the vehicle generally moves in a forward direction, the control for switching the steering system from one of the forward steering modes of operation to the reverse mode of operation should be readily and easily accessible for actuation by the vehicle's operator. Further, the control should enable the operator to readily return operation of the equipment to the desired forward steering mode.

Further, it is sometimes desirable to independently steer the rear wheels of the machine when moving in a forward direction. If the vehicle is moving along a road in a selected steering mode and the operator recognizes that the rear wheels require independent steering, the present invention enables the operator to (1) segregate the rear wheel steering system from the front wheel steering system (2) independently steer the rear wheels, and (3) automatically return operation of the vehicle to the selected steering mode. As the operator can still independently steer the front wheels while steering the rear wheels, the vehicle's forward travel does not have to be interrupted while the operator is repositioning the rear wheels.

SUMMARY OF THE INVENTION

It is an object of this invention to independently steer the rear wheels of a multi-purpose vehicle.

It is a further object of the invention to provide a control that may be readily actuated by a vehicle's operator to override a selected steering mode of operation to enable the operator to steer the rear wheels relative to the front wheels.

It is yet another object of this invention to provide a hydraulic fluid steering system including an override control to isolate the rear wheels from the front wheels to permit independent steering of the rear wheels and to automatically return the steering system to its selected mode when independent rear wheel steering is no longer necessary.

These and other objects of the invention are attained in a steering system for a vehicle having a hydraulic steering system for controlling the position of a pair of front wheels and a pair of rear wheels relative to the frame of the vehicle including hydraulic cylinder means connected to the wheels for steering same in a desired direction. Steering means are interposed in the hydraulic fluid circuit for selectively directing hydraulic fluid to the cylinder means for steering the wheels. Mode selector means is interposed in the fluid flow circuit between the steering means and the cylinder means for selectively selecting either four-wheel steer, crab steer or front-wheel steer mode of steering for the vehicle. Control means is included for momentarily overriding the mode selector means to isolate the rear hydraulic means from the front cylinder means for independently steering the rear wheels of the machine.

The invention further includes a method of steering a vehicle having a hydraulic steering system for controlling the position of a pair of front wheels and a pair of rear wheels relative to the frame of the vehicle including selecting either front-wheel steer, crab steer or four-wheel steer mode of operation; and momentarily overriding the selected mode of operation for isolating the pair of rear wheels from the pair of front wheels for permitting independent steering of the rear wheels relative to the front wheels.

BRIEF DESCRIPTION OF THE DRAWING

The single FIGURE of the drawing schematically illustrates a preferred embodiment of the present invention.

DESCRIPTION OF THE PREFERRED EMBODIMENT

Referring now to the drawing, there is disclosed a preferred embodiment of the present invention. In particular, there is disclosed a steering system for a movable construction machine supported on wheels for movement along the underlying road or other surface. As is well known, such construction equipment must be steerable in both forward and backward directions to permt safe and efficient operation.

System 10 includes sump 14 serving as a source of hydraulic fluid. Pump 18 delivers hydraulic fluid through line 12 from sump 14. The discharge side of pump 18 is connected to a pair of lines 20 and 22 which provide parallel flow paths for the fluid discharged from the pump. Line 22 delivers fluid to the inlet side of rear steer mode selector valve 24. Valve 24 includes a movable spool having a plurality of conduits, with movement of the spool selectively aligning one or more of the conduits with the inlet and outlet from the valve. With the spool in the position illustrated in the drawing, the valve is in what shall be termed hereinafter "neutral" position whereby fluid delivered from pump 18 is transmitted through lines 22, 28, 40 and 16 to sump 14. As shall be more fully explained hereinafter, when the valve is in its neutral position, the valve does not affect operation of any of the remaining components of system 10.

A first portion of the spool of valve 24 includes conduits 34, 35, and 36. A second portion of the spool includes conduits 42, 45, and 47. As is illustrated, conduits 35 and 45 have discontinuities to prevent flow therethrough. In addition to line 28, valve 24 has line 30 connected to its inlet side. Line 30 includes check valve 32. In addition to line 40, the outlet of valve 24 includes lines 38 and 43. The operation of valve 24 shall be more fully explained hereinafter.

Conduits 38 and 43 connected to the outlet of valve 24 deliver hydraulic fluid directly to rear steer cylinder means 94 and 96. Each of the cylinder means includes a movable piston 98. The rod of each piston 98 is connected to wheels 85 of the vehicle through linkage means 87. Movement of the pistons within the cylinder means turn the attached wheels in a desired direction. The front wheels of the vehicle are connected to pistons 98 provided within front steer cylinder means 90 and 92. Hydraulic fluid is selectively supplied to or discharged from the front steer cylinder means via lines 82, 84, 86 and 88.

As noted previously, line 20 provides a bypass flow path about valve 24 and delivers hydraulic fluid to steering unit valve 44. Valve 44 also includes a movable spool having a plurality of conduits, with movement of the spool selectively aligning one or more of the conduits with the inlet and outlet from the valve. One portion of the spool includes conduits 46, 48 and 56. A second portion of the spool includes conduits 50, 52 and 54. The internal conduits of valve 44 selectively connect inlet lines 60 or 62 of hand pump 66 to outlet lines 58 or 64. Hand pump 66 is connected to the steering wheel (not shown) of the vehicle.

System 10 further includes steering mode selector valve 70. Valve 70 includes a movable rotor having a plurality of conduits, with movement of the rotor selectively aligning one or more of the conduits with the inlet and outlet from the valve. A first portion of the rotor includes internal conduits 74 and 76 while a second portion of the rotor includes internal conduits 78 and 80.

System 10 further includes dual pilot check valve means 72. Valve means 72 includes inlet lines 102 and 108 connecting the valve to steering mode selector valve 70. Check valve 104 is disposed within line 102 while check valve 110 is disposed within line 108. Valve means 72 further includes pilot lines 114 and 116. Line 114 communicates line 102 upstream of valve 104 to valve 110. Line 116 communicates line 108 upstream of valve 110 to valve 104. The specific function of lines 114 and 116 shall be more fully explained hereinafter. Lines 106 and 112 connect valve means 72 to rear steer cylinder means 94 and 96 via lines 100 and 107.

OPERATION

The above described hydraulic steering system finds particular utility for steering movable construction equipment along the underlying road. The particular construction equipment may have many uses, as for example one of the uses of the equipment may be in railroad maintenance. When so employed, the wheels of the vehicle straddle the railroad's rails. Generally, such equipment has three independent forward steering modes of operation, i.e. four-wheel steer, front-wheel steer, and crab steer. In moving in the reverse or backward direction, it is necessary that the rear wheels be independently steerable to prevent the wheels from "climbing" the rails. The present invention provides a steering system providing the three independent forward steering modes of operation plus a control for switching from one of the forward steering modes of operation to a reverse mode of operation for momentarily isolating the rear steering cylinder means from the front steering cylinder means to enable the operator of the vehicle to exactly reposition the machine's rear to prevent the rear wheels from "climbing" the rails.

Initially, the three standard forward steering modes of operation shall be described. When the vehicle is moving in a forward direction under control of one of the three forward steering modes of operation, rear steer valve means 24 is in the neutral position illustrated in the drawing thereby preventing flow of fluid through either lines 38 or 43. The flow of fluid to valve 24 from pump 18 is returned via conduits 40 and 16 to sump 14.

During forward movement of the equipment, the steering system operates in a selected one of the three modes. The spool of steering unit valve 44 is positioned to direct fluid through either line 64 or line 58 if it is desired to respectively turn the front wheels either to the left or to the right.

Specifically, with the rotor portion of mode selector valve 70 positioned in the manner illustrated, the system is operating in front wheel steer mode. Assuming, it is desired to turn the front wheels toward the right, the spool of valve 44 will be moved to align conduit 46 with line 20, conduit 48 with line 120, and conduit 56 with lines 62 and 64. Thus, fluid flowing through line 20 will pass through conduit 46 into line 60, pump 66, line 62, and conduit 56 thereby flowing into line 64. The hydraulic fluid delivered through line 64 flows into rod-end 93 of cylinder means 92 via line 88. The fluid is also delivered by line 86 into piston-end 91 of cylinder means 90. The flow of hydraulic fluid will thus force piston 98 of cylinder means 92 inwardly and piston 98 of cylinder means 90 outwardly. The foregoing movement of the respective pistons will turn the wheels attached thereto to provide for a right turn for the vehicle. The degree of turn will be controlled by the amount of fluid delivered into the respective cylinder means via pump 66 which as noted previously, is mechanically attached to the vehicles's steering wheel.

The movement of the pistons within cylinder means 90 and 92 will displace hydraulic fluid through lines 82 and 84. The combined flow of hydraulic fluid delivered through line 82 passes through line 58 and conduit 48 into line 120 and is then returned to the sump for reuse.

In the front wheel steer mode of operation, when it is desired to make a left hand turn, the spool portion of steering valve 44 will be moved to align conduit 50 with line 20 and conduit 52 with line 120. Additionally, conduit 54 is aligned with pump outlet line 60 and line 58. The hydraulic fluid flowing through line 58 passes through line 82 into piston-end 95 of cylinder means 92. Additionally, hydraulic fluid is directed through line 84 into rod-end 89 of cylinder means 90. The resultant movement of the pistons in the respective cylinder means will cause the attached wheels to move for a left-hand turn for the vehicle. The fluid displaced from piston-end 91 and rod-end 93 respectively of cylinder means 90 and 92 flows through lines 86 and 88 and conduit 52 to line 120 and then to sump 14.

When it is desired to go forward in four-wheel steer mode, the rotor portion of mode selector valve 70 is moved to align conduits 74 and 76 respectively with lines 82 and 58. With the rotor portion of mode selector valve so positioned, when it is desired to turn the front wheels right and rear wheels left, conduits 46 and 48 of valve 44 are respectively aligned with conduits 20 and 120. Additionally conduit 56 is aligned with conduits 62 and 64. The foregoing results in the supply of fluid to rod-end 93 of cylinder means 92 and to the piston end 91 of cylinder means 90.

The fluid displaced from the respective cylinder means flows through lines 84 and 82 and thence into conduit 74 aligned therewith. The fluid thence flows through line 102, and unseats check valve 104 provided in dual pilot check valve means 72. The unseating of check valve 104 enables fluid to flow through conduit 106 toward rear steer cylinder means 94 and 96. The fluid is delivered into rod-end 97 of cylinder means 96 and, also is supplied via line 107 to piston-end 101 of cylinder means 94.

The fluid respectively displaced from cylinder means 94 and 96 flows through lines 100 and 105 into line 112. As check valve 110 of valve means 72 is seated due to the flow of fluid through line 112, a back pressure is developed which, in turn, results in valve 104 being seated. The resulting build up in pressure in line 102 causes a pilot flow of fluid through line 114, thereby unseating valve 110. Once valve 110 is unseated, hydraulic fluid flows via line 112 into line 108. The subsequent reduction in back pressure again permits valve 104 to unseat. The fluid flow through line 108 is delivered via conduit 76 of mode selector valve 70 into line 58 communicating therewith. The fluid thereafter returns to the sump via conduit 48 and line 120.

When it is desired to four wheel steer to the left, the spool portion of valve 44 is moved to align conduits 50 and 52 respectively with lines 20 and 120. Additionally, conduit 54 is aligned with lines 60 and 58. Hydraulic fluid flows via conduit 76 into line 108 unseating valve 110 to permit continued fluid flow through line 112. As noted before, line 112 communicates with lines 105 and 100 thereby delivering hydraulic fluid respectively into piston-end 99 of cylinder means 96 and rod-end 103 of cylinder means 94.

The fluid displaced from piston-end 101 and rod-end 97 respectively of cylinder means 94 and 96 flows via lines 107 and 106 into valve means 72. The fluid flow results in check valve 104 being seated, with the resulting build up of back pressure causing valve 110 to also seat. Hydraulic fluid is thence delivered through pilot line 116 to unseat valve 104 enabling fluid to flow via line 106 into line 102. The reduction in back pressure results in valve 110 again being unseated to permit continued fluid flow to rear steer cylinder means 94 and 96. Fluid flow through conduit 74 of valve 70 is thence directed via lines 82 and 84 respectively into piston-end 95 of cylinder means 92 and rod-end 89 of cylinder means 90. The fluid displaced from the cylinder means flows via lines 86, 88 and 64, and conduit 52 into line 120 and is thence returned to the sump.

When it is desired to operate the vehicle in crab steer mode of operation, the rotor of valve 70 is positioned to align conduits 78 and 80 respectively with lines 58 and 82.

As in four wheel steer mode of operation, when it is desired to steer the wheels to propel the vehicle towards the right the spool portion of valve 44 is moved to align conduits 46 and 48 with lines 20 and 120. This in turn aligns conduit 56 with lines 62 and 64. Fluid is thereby directed to rod-end 93 of cylinder means 92 and piston-end 91 of cylinder means 90. Fluid displaced from cylinder means 90 and 92 flows via lines 84 and 82 and conduit 80 of valve 70 into line 108. The hydraulic fluid flowing through line 108 into valve means 72 unseats check valve 110 to supply fluid into line 112. As lines 100 and 105 are in communication therewith, fluid is delivered via the respective lines into rod-end 103 of cylinder means 94 and piston-end 99 of cylinder means 96. The fluid displaced from cylinder means 94 and 96 flows via lines 107 and 106 into valve means 72. The hydraulic fluid seats valve 104. The resulting build up in back pressure causes valve 110 to seat terminating flow of hydraulic fluid through valve 72. The consequent build up of fluid pressure in line 108 causes flow through pilot line 116 to unseat valve 104. With valve 104 unseated, hydraulic fluid passes from line 106 into line 102. The flow thereafter passes through conduit 78, line 58, conduit 48 of valve 44 and line 120 to the sump.

To steer the front wheels and the rear wheels toward the left, the spool portion of valve 44 is energized to align conduit 50 with line 20 and conduit 52 with line 120. Additionally, conduit 54 is aligned with lines 58 and 60. Since it is desired to maintain the four-wheel steer for the vehicle, conduits 78 and 80 remain aligned respectively with lines 58 and 82.

The flow of fluid through line 58 passes through conduit 78 and thence through line 102 opening check valve 104 of valve means 72. The flow of fluid then passes through lines 106 and 107 into rod-end 97 of cylinder means 96 and piston end 101 of cylinder means 94.

The flow of fluid displaced from the cylinder means by movement of the pistons passes therefrom via lines 100 and 105 into line 112. Since valve 110 is seated due to the fluid flow thereagainst, fluid flow through line 106 is terminated thereby closing valve 104 and developing a back pressure within line 102. The consequent build up of fluid pressure within line 102 causes fluid flow through pilot line 114 opening valve 110. Consequently, fluid again flows through lines 106 and 112.

Conduit 80 of valve 70 is aligned with line 108 thereby delivering fluid to lines 82 and 84. This provides fluid pressure into piston-end 95 of cylinder means 92 and rod-end 89 of cylinder means 90.

The fluid displaced from the respective cylinder means is supplied via lines 86, 88 and 64, and conduit 52 through line 120 to sump 14.

The system heretofore described permits an operator to readily steer a vehicle in either front-wheel steer, four-wheel steer or crab steer modes. As indicated previously, it is necessary that the vehicle be steerable when moving in a rearward or reverse direction. When moving in a reverse direction, it is desirable that the rear wheels be independently steerable relative to the front wheels and/or the vehicle's frame. Accordingly, it is desirable that the operator be able to quickly and effectively place the vehicle in a separate rear-steer mode when the vehicle is moving in a reverse direction. Typically, it will only be necessary to travel in a reverse direction for a very short period of time to permit desired turning of the rear wheels. When the rear wheels have been properly positioned, the standard or normal operation for the construction vehicle is to again move in a forward direction. Thus, the steering system should accommodate a momentary isolation of the rear steering cylinders from the front steering cylinders to permit exact repositioning of the rear end of the machine. Further, once "fine tuning" the rear wheels has been accomplished, then the control system should readily accommodate return of the steering system to the selected forward steering mode.

The foregoing objectives are achieved in the present control system by providing a separate rear steer mode selector valve 24. As indicated previously, the rear steer valve normally is operated in a neutral position whereby fluid flow therethrough returns directly to sump 14. However, when it is desired to actuate the rear steer cylinders independently of the front steer cylinders, as when the vehicle is traveling in a reverse direction, the operator activates a rear steer lever which moves the spool of valve 24 to align conduits 34, 35 and 36 or 42, 45 and 47 with lines 26, 28, 30, 38, 40 and 43.

When conduits 34, 35 and 36 are respectively aligned with lines 43, 40 and 38, fluid flow through line 30 and check valve 32 into valve 24 is directed through conduit 34 into line 43. The fluid flow passes into rod-end 97 of cylinder means 96 and piston-end 101 of cylinder means 94. The fluid displaced from cylinder means 94 and 96 flows through line 38, conduit 36, and returns to the sump via lines 26 and 16. Fluid also flows from line 43 through line 106 to close check valve 104. As the check valve is closed, there will result a consequent build up of back pressure in line 112 to also close check valve 110 terminating all flow of fluid from valve 70 through valve means 72. Since the fluid pressure delivered via line 43 through line 106 is essentially pump pressure, valve 104 will remain seated irrespective of any consequent flow of fluid through pilot line 116 resulting from the closure of valve 110. Essentially, valve means 72 isolates rear steer cylinder means 94 and 96 from the front steer cylinder means 90 and 92 when rear steer mode selector valve 24 is actuated. Since the rear steer cylinders means is independently controlled upon actuation of rear steer mode selector valve 24, valve 70 and steering unit valve 44 can be maintained in their original position. Thus, when the operator has exactly positioned the rear wheels of the machine in a desired location, he merely releases rear steer mode selector valve 24 to automically return the steering system to its initial steering mode.

If the operator desires to turn the rear wheels of the machine in a direction opposite to that heretofore described, rear steer mode selector valve is actuated to place conduits 42, 45 and 47 in respective alignment with conduits 38, 40 and 43.

The foregoing directs fluid flow through line 38 into the piston end 99 of cylinder means 96 and rod-end 103 of cylinder means 94. Simultaneously fluid flows through line 112 to close check valve 110 of valve means 72 thus, isolating the rear steer cylinder means from the front steer cylinder means in the manner heretofore described. Fluid displaced from the rear steer cylinder means returns to sump 14 via line 43, conduit 47 and lines 26 and 22. Since actuation of rear steer mode selector valve 24 segregates rear wheels cylinder means 94 and 96 from front wheels cylinder means 90 and 92, the operator can continue to steer the front wheels through operation of the steering wheel while independently steering the rear wheels. When the rear wheels have been properly positioned, the operator releases the actuating mechanism for valve 24, automatically returning steering of the rear wheels to the selected steering mode. The foregoing should be contrasted to prior art arrangements which require a control to lock the front wheels to permit independent steering of the rear wheels. The prior art does not automatically return the steering system to a selected mode once the rear wheels have been positioned. Rather the operator must again activate the mode selector valve to obtain the selected steering mode.

When independent rear steering of the wheels is undertaken, the degree of turn of the rear wheels is dependent upon the time interval valve 24 is activated. Thus, the operator can "fine tune" the position of the rear wheels merely by "tapping" the activating mechanism for valve 24. Further, by enabling the operator to continue to steer the front wheels in the selected steering mode while independently steering the rear wheels, the operator will have increased flexibility in maneuvering the vehicle in either forward or reverse directions.

The foregoing described steering system permits the operator of a construction vehicle to readily independently position the rear wheels thereof with respect to the front wheels thereof. Additionally, this system permits the operator to quickly return the steering system to the original mode of operation once the rear wheels have been positioned in the desired location. Rear steer mode selector valve 24 and valve means 72 function as an override control to momentarily interrupt the selected steering mode and isolate the rear steer cylinder means from the front steer cylinder means when independent rear steer control is required.

While a preferred embodiment of the present invention has been described and illustrated, the invention should not be limited thereto but may otherwise be embodied within the scope of the following claims.

The embodiments of the invention in which an exclusive property or privilege is claimed are defined as follows:

1. A system for steering a construction vehicle having a pair of front wheels and a pair of rear wheels comprising:
   a hydraulic fluid circuit for distributing hydraulic fluid;
   hydraulic cylinder means connected to each wheel for steering the connected wheel;
   steering means interposed in the hydraulic fluid circuit for selectively directing hydraulic fluid to said cylinder means for steering said wheels in a desired direction;
   mode selector means interposed in the fluid flow circuit between said steering means and said cylinder means for selectively selecting either four-wheel steer, crab steer, or front-wheel steer mode of steering for said vehicle; and
   override means for isolating said rear hydraulic cylinder means from said front cylinder means including flow control means for independently supplying fluid to said rear cylinder means for independently steering the rear wheels of the vehicle, said flow control means including rear steer valve means for selectively selecting rear steer mode of operation; and a dual pilot check valve interposed in the hydraulic fluid flow circuit between said mode selector means and said rear hydraulic cylinder means and operable when said rear steer valve means is positioned for selecting rear steer mode of operation to isolate said rear steer cylinder means from said mode selector means and said steering means.

2. A system for steering a construction vehicle having a pair of front wheels and a pair of rear wheels comprising:
   a hydraulic fluid circuit;
   pump means disposed in said circuit for distributing hydraulic fluid through said circuit;
   a pair of parallel conduits connected to the outlet of said pump means;
   normally closed rear steer valve means disposed in a selected one of said pair of parallel conduits operable to control flow of fluid through said selected one conduit;
   hydraulic cylinder means connected to each wheel for steering the connected wheel;

steering means interposed in the other of said pair of parallel conduits for selectively directing hydraulic fluid to said cylinder means for steering said wheels in a desired direction;

mode selector means interposed in the other of said pair of parallel conduits between said steering means and said cylinder means for selectively selecting either four-wheel steer, crab steer, or front-wheel steer mode of steering for said vehicle;

said selected one conduit being connected to said cylinder means for said rear wheels for delivering hydraulic fluid to said rear wheels cylinder means through said rear steer valve means when said valve means is opened; and segregating means interposed in the fluid circuit between said rear wheels cylinder means and said mode slector means for preventing flow from said mode selector means to said rear wheel cylinder means when the rear steer valve means is opened.

* * * * *